United States Patent
Gilson et al.

(10) Patent No.: US 9,616,323 B2
(45) Date of Patent: Apr. 11, 2017

(54) GAME, SUCH AS ELECTRONIC COLLECTABLE AND CARD OR TRADABLE OBJECT GAME EMPLOYING CUSTOMIZABLE FEATURES

(71) Applicant: Wizards of the Coast LLC, Renton, WA (US)

(72) Inventors: Frank Gilson, Renton, WA (US); Cormac Russell, Milpitas, CA (US); Paul Sottosanti, Seattle, WA (US); Randy Buehler, Bellevue, WA (US); Ramon Arjona, Seattle, WA (US); Karl Robert Gutschera, Seattle, WA (US); Brandon Anthony Bozzi, Seattle, WA (US); Aaron Joel Forsythe, Renton, WA (US)

(73) Assignee: Wizards of the Coast, Inc., Renton, WA (US)

( * ) Notice: Subject to any disclaimer, the term of this patent is extended or adjusted under 35 U.S.C. 154(b) by 539 days.

(21) Appl. No.: 13/923,702

(22) Filed: Jun. 21, 2013

(65) Prior Publication Data
US 2013/0281173 A1    Oct. 24, 2013

Related U.S. Application Data

(60) Division of application No. 12/176,873, filed on Jul. 21, 2008, now Pat. No. 8,523,648, which is a
(Continued)

(51) Int. Cl.
A63F 9/24        (2006.01)
A63F 1/02        (2006.01)
(Continued)

(52) U.S. Cl.
CPC .................. *A63F 1/02* (2013.01); *A63F 1/00* (2013.01); *A63F 1/10* (2013.01); *A63F 2009/0615* (2013.01); *A63F 2250/602* (2013.01)

(58) Field of Classification Search
CPC ........ A63F 1/00; A63F 1/02; A63F 2250/602; A63F 2009/0615
See application file for complete search history.

(56) References Cited

U.S. PATENT DOCUMENTS 3,738,659 A    6/1973  Partridge
4,906,216 A    3/1990  Abeshouse
(Continued)

FOREIGN PATENT DOCUMENTS

JP    62-142576    6/1987
JP    42-18189     8/1992
(Continued)

OTHER PUBLICATIONS

"Gloom: The Game of Inauspicious Incidents and Grave Consequences," Atlas Games: Charting New Realms of Imagination, http://www.atlas-games.com/product_tables/AG1250.php, Released Jan. 2005, 4 pages [Internet accessed on Apr. 10, 2008].
(Continued)

*Primary Examiner* — Jay Liddle
*Assistant Examiner* — Alex F. R. P. Rada, II
(74) *Attorney, Agent, or Firm* — Perkins Coie LLP

(57) ABSTRACT

A game employing user-modifiable game components, such as cards in a collectable card game, employs various features to provide user-modifiability, including sleeves, transparent cards, stickers, and other elements. Electronic versions of the game and various other features are included, including tracking of history associated with such components.

22 Claims, 8 Drawing Sheets

Related U.S. Application Data continuation of application No. 11/952,072, filed on Dec. 6, 2007, now abandoned, which is a continuation of application No. 11/738,308, filed on Apr. 20, 2007, now abandoned, which is a continuation-in-part of application No. PCT/US2006/002277, filed on Jan. 24, 2006.

(60) Provisional application No. 60/646,724, filed on Jan. 24, 2005, provisional application No. 60/794,210, filed on Apr. 21, 2006.

(51) Int. Cl.
*A63F 1/00* (2006.01)
*A63F 1/10* (2006.01)
*A63F 9/06* (2006.01)

(56) References Cited

U.S. PATENT DOCUMENTS

| | | | |
|---|---|---|---|
| 4,950,912 | A | 8/1990 | Goldfarb et al. |
| 5,067,723 | A | 11/1991 | Yurkovic |
| 5,082,287 | A | 1/1992 | Nwanna |
| 5,190,285 | A | 3/1993 | Levy et al. |
| 5,308,065 | A | 5/1994 | Bridgeman et al. |
| 5,411,259 | A | 5/1995 | Pearson et al. |
| 5,433,035 | A | 7/1995 | Bauer |
| 5,580,294 | A | 12/1996 | Briant |
| 5,622,332 | A | 4/1997 | Bennitt et al. |
| 5,662,332 | A | 9/1997 | Garfield |
| 5,689,561 | A | 11/1997 | Pace |
| 5,743,801 | A | 4/1998 | Welander |
| 5,748,731 | A | 5/1998 | Shepherd |
| 5,766,077 | A | 6/1998 | Hongo |
| 5,785,593 | A | 7/1998 | Wood et al. |
| 5,954,332 | A | 9/1999 | Mero et al. |
| 6,009,458 | A | 12/1999 | Hawkins et al. |
| 6,089,975 | A | 7/2000 | Dunn |
| 6,200,216 | B1 | 3/2001 | Peppel |
| 6,267,678 | B1 | 7/2001 | Kubo et al. |
| 6,318,723 | B1 | 11/2001 | Kurita |
| 6,347,994 | B1 | 2/2002 | Yoshikawa et al. |
| 6,375,566 | B1 | 4/2002 | Yamada |
| 6,398,651 | B1 | 6/2002 | Yamada |
| 6,419,584 | B1 | 7/2002 | Sakamoto et al. |
| 6,435,508 | B1 | 8/2002 | Tavel |
| 6,468,162 | B1 | 10/2002 | Nakamura |
| RE37,957 | E | 1/2003 | Garfield |
| 6,508,706 | B2 | 1/2003 | Sitrick et al. |
| 6,520,827 | B1 | 2/2003 | Liu |
| 6,544,119 | B2 | 4/2003 | Kubo et al. |
| 6,581,932 | B2 | 6/2003 | Jacobs |
| 6,595,858 | B1 | 7/2003 | Tajiri et al. |
| 6,601,851 | B1 | 8/2003 | Sakamoto et al. |
| 6,656,039 | B2 | 12/2003 | Yamada |
| 6,659,463 | B2 | 12/2003 | Mackey |
| 6,666,770 | B1 | 12/2003 | Kubo et al. |
| 6,688,973 | B2 | 2/2004 | Satloff et al. |
| 6,745,236 | B1 | 6/2004 | Hawkins et al. |
| 6,758,754 | B1 | 7/2004 | Lavanchy et al. |
| 6,761,637 | B2 | 7/2004 | Weston et al. |
| 6,764,402 | B2 | 7/2004 | Tajiri et al. |
| 6,773,351 | B2 | 8/2004 | Brown |
| 6,857,633 | B1 | 2/2005 | Mackey |
| 6,938,898 | B2 | 9/2005 | Merritt, III |
| 6,994,344 | B2 | 2/2006 | Kitaygorodskiy et al. |
| 7,118,107 | B2 | 10/2006 | Niedner et al. |
| 7,201,374 | B2 | 4/2007 | Bielman |
| 7,216,870 | B1 | 5/2007 | Bess et al. |
| 8,523,648 | B2 * | 9/2013 | Gilson .................. A63F 1/00 273/236 |
| 2002/0052238 | A1 | 5/2002 | Muroi |
| 2002/0072413 | A1 | 6/2002 | Arias et al. |
| 2002/0077180 | A1 | 6/2002 | Swanberg et al. |
| 2002/0077182 | A1 | 6/2002 | Swanberg et al. |
| 2002/0147039 | A1 | 10/2002 | Mahar et al. |
| 2002/0155893 | A1 | 10/2002 | Swanberg et al. |
| 2003/0020239 | A1 | 1/2003 | Hagen et al. |
| 2003/0071414 | A1 | 4/2003 | Weisman |
| 2003/0107173 | A1 | 6/2003 | Satloff et al. |
| 2003/0171142 | A1 | 9/2003 | Kaji et al. |
| 2004/0152521 | A1 | 8/2004 | Shinoda |
| 2004/0166913 | A1 | 8/2004 | Shinoda |
| 2004/0212148 | A1 | 10/2004 | Losey et al. |
| 2004/0227292 | A1 | 11/2004 | Bodish |
| 2004/0229672 | A1 | 11/2004 | Aoki et al. |
| 2004/0242293 | A1 | 12/2004 | McWilliams |
| 2005/0017450 | A1 | 1/2005 | Weisman et al. |
| 2005/0073098 | A1 | 4/2005 | Weisman |
| 2005/0077676 | A1 | 4/2005 | Long et al. |
| 2005/0167919 | A1 | 8/2005 | Grant et al. |
| 2006/0063576 | A1 | 3/2006 | Schwartz |
| 2009/0023487 | A1 * | 1/2009 | Gilson .................. A63F 1/00 463/11 |
| 2009/0115133 | A1 | 5/2009 | Kelly et al. |
| 2011/0319161 | A1 | 12/2011 | Glassman et al. |

FOREIGN PATENT DOCUMENTS

| | | |
|---|---|---|
| WO | WO-90/11110 A1 | 10/1990 |
| WO | WO-01/86587 A2 | 11/2001 |

OTHER PUBLICATIONS

"Humaliens Living Rulebook," Alderac Entertainment Group—HumAliens, Version 1.1, Released Nov. 10, 2003, 13 pages [Internet accessed on Jan. 9, 2006].
"Hyborian Gates Collectible Card Game, Cardz—1995," http://ourworld.compuserve.com/homepages/allender/hyborian.htm, 28 pages [Internet accessed on Apr. 15, 2008].
"Hyborian Gates," http://www.ccgworkshop.com/games/hgates/rules/hyborian.gates.rules.htm, Cadiz, 1995 14 pages [Internet accessed Dec. 28, 2007].
"LEGO Racers," The LEGO Group, Released on Jul. 31, 1999, 2 pages.
"Let's Play Z-G Basic Rules," Automoton, Inc., 2001, 2 pages.
"Mechwarrior: Age of Destruction," Quick-Start and Rules of Warfare, WizKids, Inc., 2003, 64 pages.
"Shadowrun Duels Expanded Rules," Wizkids LLC, 2003, 7 pages.
"Warhammer—The Game of Fantasy Battles," Games Workshop—Warhammer, http://web.archive.org/web/20041205134145/http://oz.games-workshop.com/games/warhammer/default.htm, 4 pages [Accessed on Internet Archives on Oct. 28, 2008].
"Welcome to Magi-Nation," Interactive Imagination Corporation, Release Date: Mar. 15, 2001, http://www.ccgworkshop.com/games/magination/rules/NDrulebook.html, 23 pages [Internet accessed on Jan. 9, 2006].
"What are Z-CARDZ", Main Magic Twenty, accessed via Wayback Machine, Feb. 7, 2005, http://web.archive.org/web/20050207045106/http://z-cardz.co.za/z-cardz-what.htm, 1 page.
"Xevos Basic Battle: Build Rules," Hasbro, http://www.hasbro.com/xevoz/content/gameplay_print.cfm?sub=basic_rules&sec=1, [Internet accessed Jan. 9, 2006], 2 pages.
"Xevos Battle Terrain Game Rules," Hasbro, 2003, Pawtucket, RI, 10 pages.
"Z-G Game Combines Action Figures with CCG Anime-based Action Game," ICv2 News, http:www.icv2.com/articles/news/381.html, May 10, 2001, 2 pages [Internet accessed on Jan. 28, 2004].
BrikWars, http://www.brikwars.com/rules/1998/title.htm, 1998, 95 pages [Internet accessed on Dec. 18, 2007].
Broadside, Milton Bradley Co., 1962, 3 pages.
Broadsides and Boarding Parties, Game Play Manual, 1982, 15 pages.
Combots, FASA Corporation, 1983, 21 pages.
Duel Masters Trading Card Game, Internet Archives: <http://web.archive.org/web20051231010738/http://www.wizards.com/default.asp?x>=duelmasters/rules/rulebook, Dec. 31, 2005, 4 pages [Internet accessed on Oct. 28, 2008].

(56) References Cited

OTHER PUBLICATIONS

Filthy Rich, Wizards of the Coast, Inc., 1998, http://www.angelfire.com/games/zombiereviews/reviews/filthyrichrvw.htm, 5 pages [Internet accessed on Mar. 12, 2008].

Foto-Electric Football, Cadaco-Ellis, Game Description and Rules, http://www.1stingames.com/rules/, 1950, 5 pages.

Gnostica Stickers and Rules Reference, Game Rules, Looney Labs, http://www.wunderland.com/WTS/Ginohn/games/Gnostica/GnosticaRules.html, 2001, 8 pages [internet accessed on Mar. 12, 2008].

Grand Theft Auto III, http://en.wikipedia.org/wiki/Grand_Theft_Auto_III, released Oct. 2001, 23 pages.

Interstate '76, Activison, Release Date: Mar. 28, 1997, 72 pages.

Mage Knight, Complete Rules of Play, WizKids, LLC., 2003, 28 pages.

OAFE—Xevoz: Razorclaw review, http://www.oafe.net/yo/xevrc.php, 4 pages [Internet accessed on Jan. 1, 2006].

Pojo.com, "Pokemon Trading Card Game (TCG)," http://www.pojo.com/priceguide/usfossil.html, Release date: Oct. 1999, 5 pages [Internet accessed on Oct. 17, 2007].

Shaman King Collectible Figure Game, Sabertooth Games, 2004 Publication date accessed via http://boardgamegeek.com/boardgame/21744/shaman-king-collectible-figure-game, 6 pages.

Shaman King Reincarnation, Official Rulebook, The Upper Deck Company, 2004, 32 pages.

Star Wars™ Customizable Card Game™ Rulebook, Special Edition, Version 2.0, Nov. 1998, 13 pages.

Star Wars™ Trading Card Game Rulebook, Wizards of the Coast, Inc., 2005, 33 pages.

Starfarers of Catan Almanac, Mayfair Games, Inc. 2001, 28 pages.

The Triangle, "Stickfas wars entertain," http://entertainment.thetrangle.org/2002/09/19/stickfas.html, 2004, 2 pages, [Internet accessed on Jan. 28, 2004].

World of Warcraft, Blizzard Entertainment, 2004, 114 pages.

World of Warcraft, The Board Game, Blizzard Entertainment, 2005, 40 pages.

Yu-Gi-Oh!, Wikipedia, http://en.wikipedia.org/wiki/Yu-gi-oh, [Internet accessed Nov. 29, 2007], 10 pages.

Z cardz, http://www.toysnjoys.com/megazcards.html, 3 pages [accessed Jun. 24, 2003].

\* cited by examiner 106, 114          102, 110

108, 116          104, 112

GAME, SUCH AS ELECTRONIC COLLECTABLE AND CARD OR TRADABLE OBJECT GAME EMPLOYING CUSTOMIZABLE FEATURES

CROSS-REFERENCE TO RELATED APPLICATION(S)

This application is a divisional application of U.S. application Ser. No. 12/176,873, filed Jul. 21, 2008, which is a continuation of U.S. application Ser. No. 11/952,072 filed Dec. 6, 2007, which is a continuation of U.S. application Ser. No. 11/738,308, filed Apr. 20, 2007, which is a continuation-in-part of international application PCT/US 06/02277, filed Jan. 24, 2006, which claims the benefit of U.S. Provisional Application No. 60/646,724 filed Jan. 24, 2005, and also claims the benefit of U.S. Provisional Application No. 60/794,210, filed Apr. 21, 2006. All these applications are incorporated herein by reference in their entireties.

BACKGROUND

Collectible trading card games are known. U.S. Pat. Nos. 5,622,332, and RE37,957, describe such card games. Commercial examples of such games include Magic: The Gathering, Pokemon, Star Wars, MagiNation, and Shaman King. Each of these games employs different rules, although as a collectible trading card game, they include some or all of the following: collectability, casting cost, deck construction, tapping, and special ability cards. Collectability refers to a game that has a collectability element, for example, the ability to purchase additional game pieces/cards that each have levels of rarity from common, uncommon and rare cards/game pieces. Casting cost refers to a game mechanic element that requires the playing of at least one card or other game piece before other cards/game pieces are played. In other words, a player must play one or more cards/game pieces having a total number of points (or other attributes, such as colors or combination of colors, or have the appropriate number of symbols) before another type of card/game piece is played. Deck construction refers to allowing a player to customize his or her hand of cards or game pieces for use in play against an opponent under the rules of play. Tapping simply refers to designating a card or game piece as in play or in use by changing its orientation or otherwise designating it. Special ability cards or game pieces are those that alter the rules of play for at least one round during the game play.

Each of the various collectible games includes different features. For example, the Star Wars trading card game allows a player to play two or more cards representing the same Star Wars character to thereby enhance the value of power of that character. Other games employ the use of scratch off surfaces to reveal underlying numbers, clips to track points on a card, tokens to be placed on top of cards, and so forth.

Examples of collectible games not exclusively employing cards include Dungeons and Dragons Miniatures, Xevos, Warhammer, Shadowrun, Duels, and Mage Knight. Various card and other games have electronic counterparts. For example, in Magic Online™, players purchase virtual Magic: the Gathering cards and build online collections. They use these cards to build decks for play in Magic Online. And, just like with regular Magic: the Gathering cards, players can trade for the cards they are looking for. First, a player needs Magic Online software, an Internet connection, and an account. Since this allows players to join in from almost anywhere in the world, that means there are Magic games available to players continuously, with live opponents.

Next, Magic Online servers handle all rules associated with every card, but players do need to understand the rules to play well. However, players do not have to worry if a card works in a certain way or not: if the game permits it, it does. Magic Online also keeps each player's cards in an organized virtual collection with its own search engine.

For new players, Magic Online features a "Training" Room where they can learn different aspects of playing a Magic game. Between walk-through tutorials, a practice room where players can play against other folks new to the game, and an introduction to the help system, Magic Online is quickly get new players knowledgeable and involved in the game.

Figure 1:
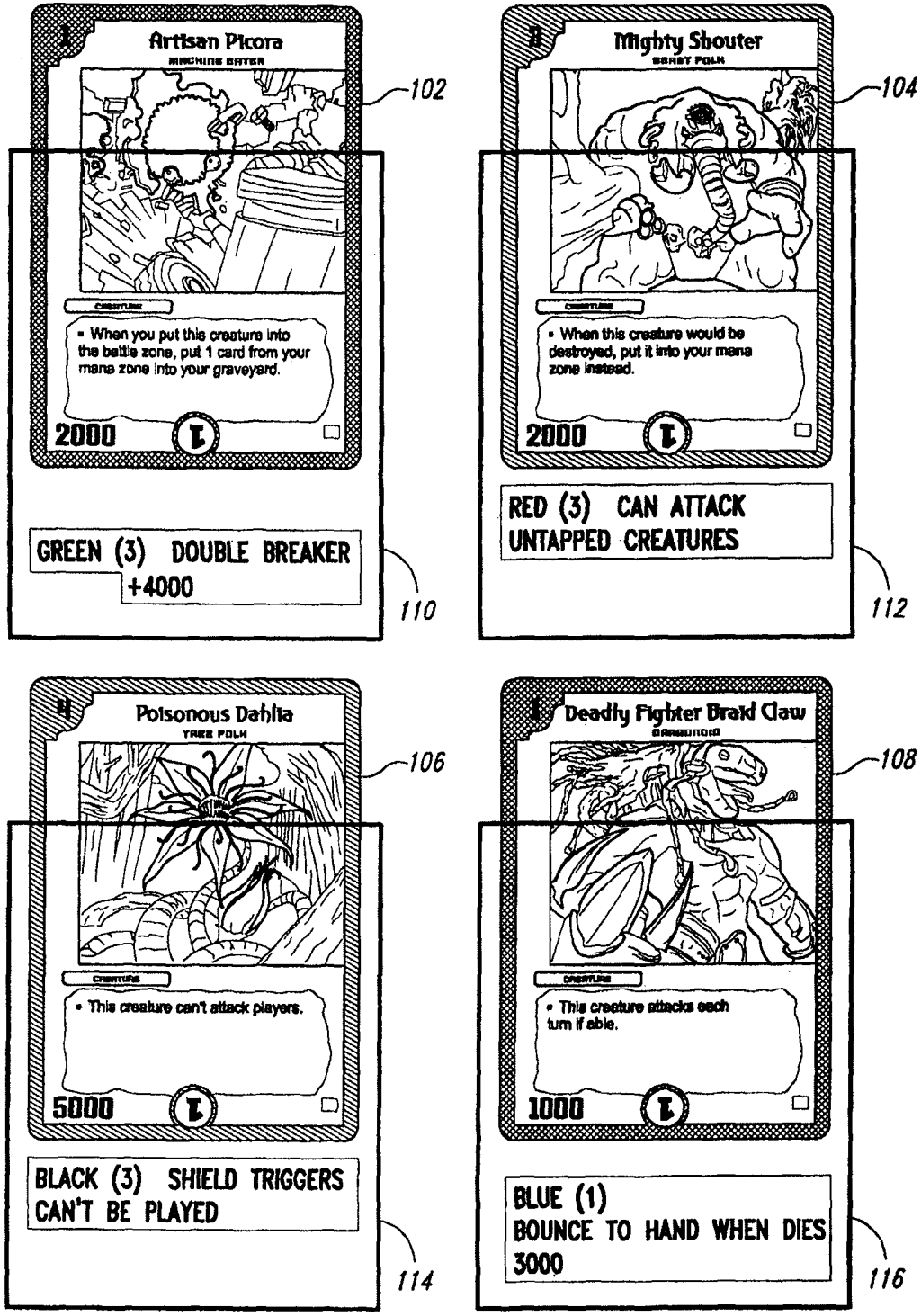
FIG. 1 is a diagram showing four trading cards, each with an associated sleeve.

Various depicted elements are not necessarily drawn to scale, and these various elements may be arbitrarily enlarged to improve legibility.

A portion of this disclosure contains material to which a claim for copyright is made. The copyright owner has no objection to the facsimile reproduction by anyone of the patent document or patent disclosure (including Figures), as it appears in the Patent and Trademark Office patent file or records, but reserves all other copyright rights whatsoever.

DETAILED DESCRIPTION

A customizable game, such as one employing trading cards, allows a player to modify a card before or during game play so that the modified card has abilities beyond the unmodified card itself. The card may be modified in any of various ways, some of which are described in detail herein. Many other details are provided below. Some or all aspects of trading card games may be employed, including collectability (the ability to purchase additional cards having levels of rarity), deck construction (allowing a player to customize his set of cards for use in play against an opponent under the rules of the game), special ability cards (cards that alter the rules of play for at least one round), and/or casting cost (requiring play of one or more cards before certain other cards are played).

Also described below is a system and method to permit a card, game piece, digital object, or other suitable game component to accumulate history or other data. This data can then be used to change the game component, such as to change its appearance, provide for it additional/enhance abilities, etc.

Also described below is a system and method to permit two or more cards, game pieces, digital object, or other type of game component to be submitted (physically or electronically) in return for one or more new cards, game pieces, or game components.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Customizable Game Components and Examples of Suitable Games

In one embodiment, transparent card sleeves are provided that receive basic cards to modify that card. The basic cards may form part of a trading card game, such as that noted above. The sleeves have some game mechanic or other information that modifies the cards received within the sleeves. For example, the game mechanic on the sleeve may overlay an existing game mechanic on a card to boost or modify the powers of the underlying card. The sleeve may include a point value, mana value or both. A portion of the sleeve may modify or cover an existing portion on the card, such as a point value on that card to thus change the value of the underlying card.

Referring to FIG. 1, one embodiment of the invention is shown where trading cards 102, 104, 106 and 108 may be played as usual under the rules of play of a trading card game, or be combined with transparent sleeves.

Figure 2:
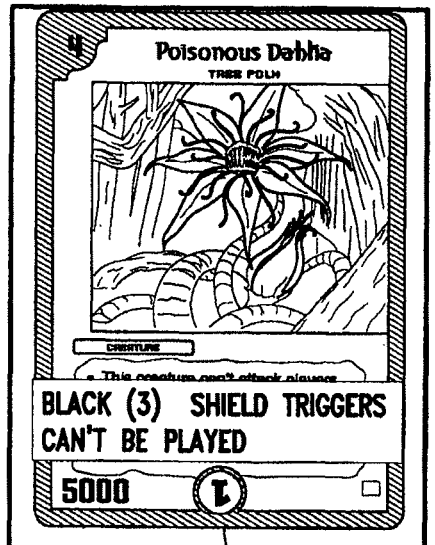
FIG. 2 is a diagram showing the four trading cards of FIG. 1 inserted into respective sleeves.
Figure 2:
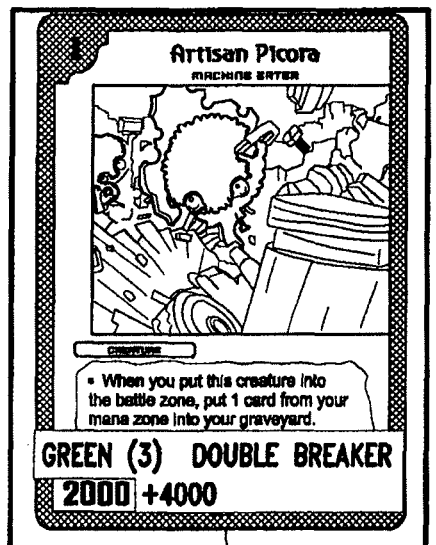
Figure 2:
Figure 2:
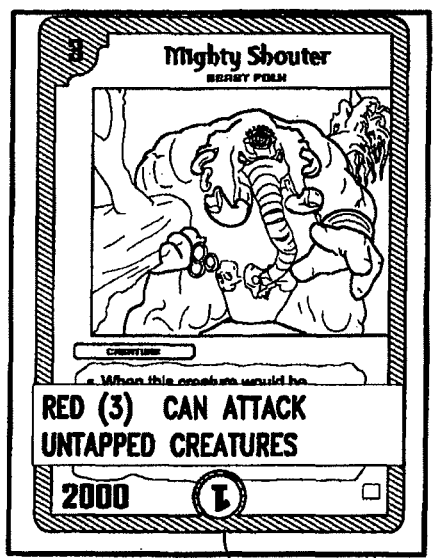

Turning now to FIG. 2, transparent plastic sleeves 110, 112, 114 or 116, respectively are shown. The sleeves may be made of two sheets of flexible transparent plastic that are heat sealed on two or three sides. Each of the sleeves, 110, 112, 114 and 116 includes some text that modifies the card inserted therein, so that the underlying card may be customized before or during game play. For example, the sleeve 110 adds a "+4000" to a power of the card inserted therein (card 102, which has a power "2000", is shown through the sleeve (as shown in the combined card in the FIG. 2)). Of course, the various cards may be inserted into any of the shown sleeves, and many other sleeves or cards may be provided in a given game.

For example, the sleeves may be employed with existing trading card games such as Duel Masters or Magic: The Gathering. These sleeves (or other objects, noted herein) may be added to a normal game card during play to create a modified or improved version of the card. Before play of a game, a player selects up to predetermined number of points of sleeves, of which no more than one can be of any given color. (The color may be associated with one of several card colors or types, wherein a sleeve of given color may only be played with a card of that same color.) When a player casts or plays a creature (or other thematic element in the game), he may give the creature one of these objects/sleeves to thereby modify that creature. When the creature leaves play, the object is discarded. In one variant, every card is sleeved when it is played, so that a player has a deck of sleeves in addition to a deck of cards. In another variant, some randomizing event (e.g., a die roll) determines which card receives a given sleeve.

Figure 3:
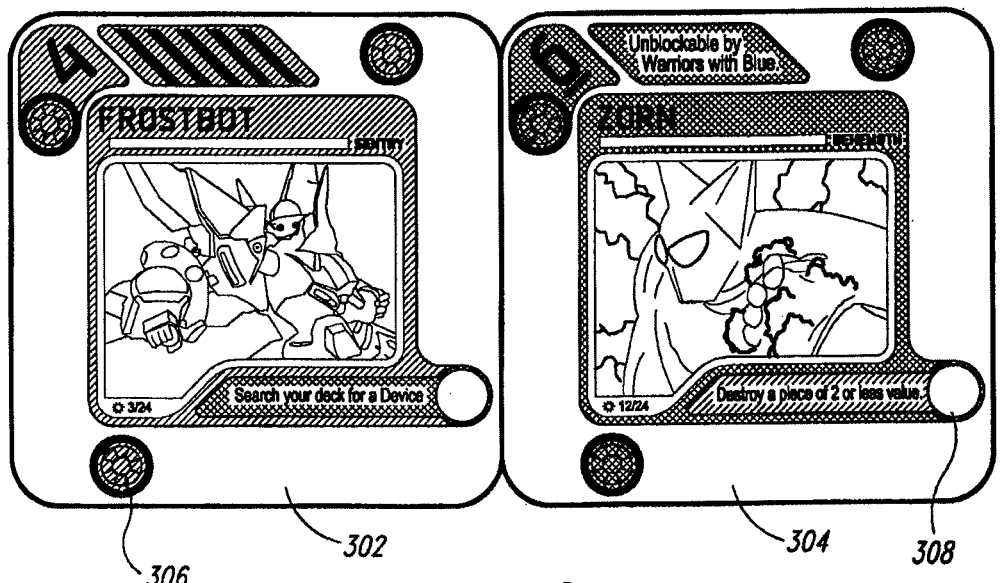
FIG. 3 is a diagram of two trading cards under an alternative embodiment.
Figure 4:
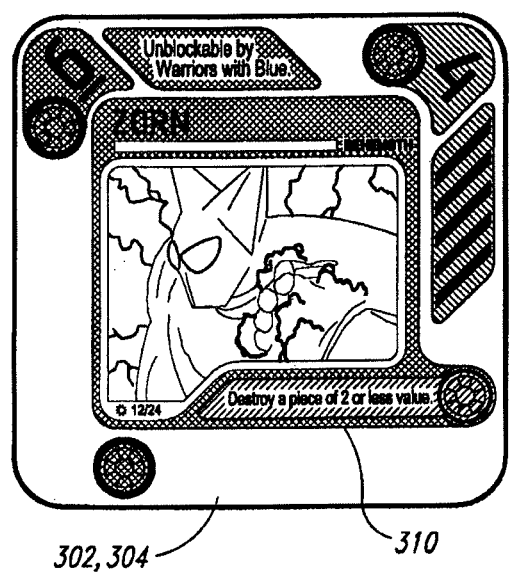
FIG. 4 is a diagram illustrating a combination of the two cards of FIG. 3.

Under an alternative embodiment shown in FIGS. 3 and 4, cards printed on a transparent substrate 302 and 304 include text and graphics specifically placed on the card so that when the cards overlay one another, portions show through to provide for a combined card, such as that shown in FIG. 4. (Alternatively or additionally, cards may be partially or fully opaque and have holes or windows cut in them so that information on underlying cards may be seen therethrough.) As shown, the card 304 is overlaid onto the card 302, so that a blue dot 306 on the card 302 shows through a window 308 on the card 304. As a result, an ability defined by text 310 on the card 304 is now available to the player. Also, text along a periphery of the cards has a lasting or staying effect from round to round during game play, but any text that may be found in the middle of the card (which gets obscured by a later, overlapping card) applies only to that given round.

Under one embodiment of a game employing the cards of FIGS. 3 and 4, a game (which may be referred to as "Crystal Warriors") employs a method of play or "game mechanic" where each player starts with five life points and four cards in his or her hand. On the first turn, the player who goes first doesn't draw any cards, and the turn sequence proceeds as follows:

1. Untap
2. Draw two cards
3. Play a mana card from your hand
4. Play spells and pieces
5. Attack.

To play a spell or a piece, a player must tap or otherwise designate one or more "mana" cards that have been played, where the total number of mana points is equal to a cost to play that card. The player must tap at least one mana that shares a color with the spell or piece of the card to be played. When a player plays a spell, the player follows its instructions and then puts it into a discard or a "graveyard" pile.

When a piece is played from a player's hand, it comes into play. In general, a piece represents a portion of a creature, which can consist of two to four pieces. A player can play a piece into play as a "fragment," which represents a single piece, and not a complete creature. It can be played on top of another piece to make a creature. If a player plays it directly on top of another piece and covers that underlying piece's power number, the other piece is effectively destroyed under the game.

Abilities are triggered (as described in a center of a piece) when a hole in the top piece lines up with a colored dot on the piece underneath. Static abilities are active as long as the piece is in or associated with the creature, but are not active if the piece is simply a fragment. Only creatures (two or more pieces) can attack, where the creature whose top piece has been put on in a given turn cannot attack in that turn. Attacking causes a creature to be tapped, and creatures attack one at a time. All creatures can block, and blocking also causes a creature to be tapped. If a creature is unblocked, the opponent loses one life, but if a creature is blocked, the two creatures then fight by comparing total power numbers of each creature, and the creature with the lower power is then sent to the graveyard. If it's a tie, then both creatures are sent to the graveyard (i.e., they "die").

Figure 5:
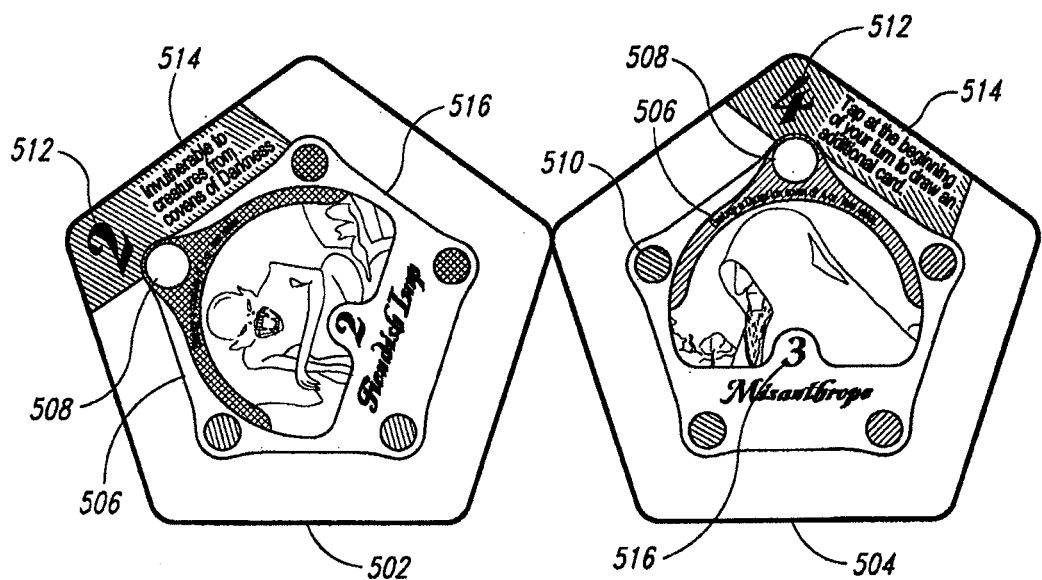
FIG. 5 is a diagram of two cards under a second alternative embodiment.
Figure 6:
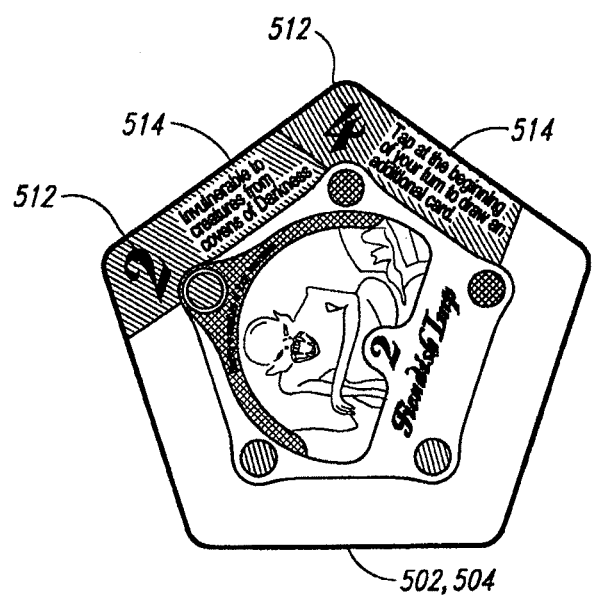
FIG. 6 is a diagram illustrating a combined card produced by the two cards of FIG. 5.

Embodiments shown in FIGS. 5 and 6 are similar to that of FIGS. 3 and 4, but as shown cards 502 and 504 have a pentagonal shape. (Of course, any shape cards may be employed.) Again, card 502 may be overlaid upon card 504 to provide a combined card shown in FIG. 6. In this instance, text 506 positioned near a clear opening 508 in the card 502 may correspond with a like color dot on an underlying card. In this case, however, a black dot 510 is positioned through the clear opening 508, and thus the text 506 does not apply to the combined card because the colors surrounding the clear opening 508 differ (red as opposed to black).

Figure 7:
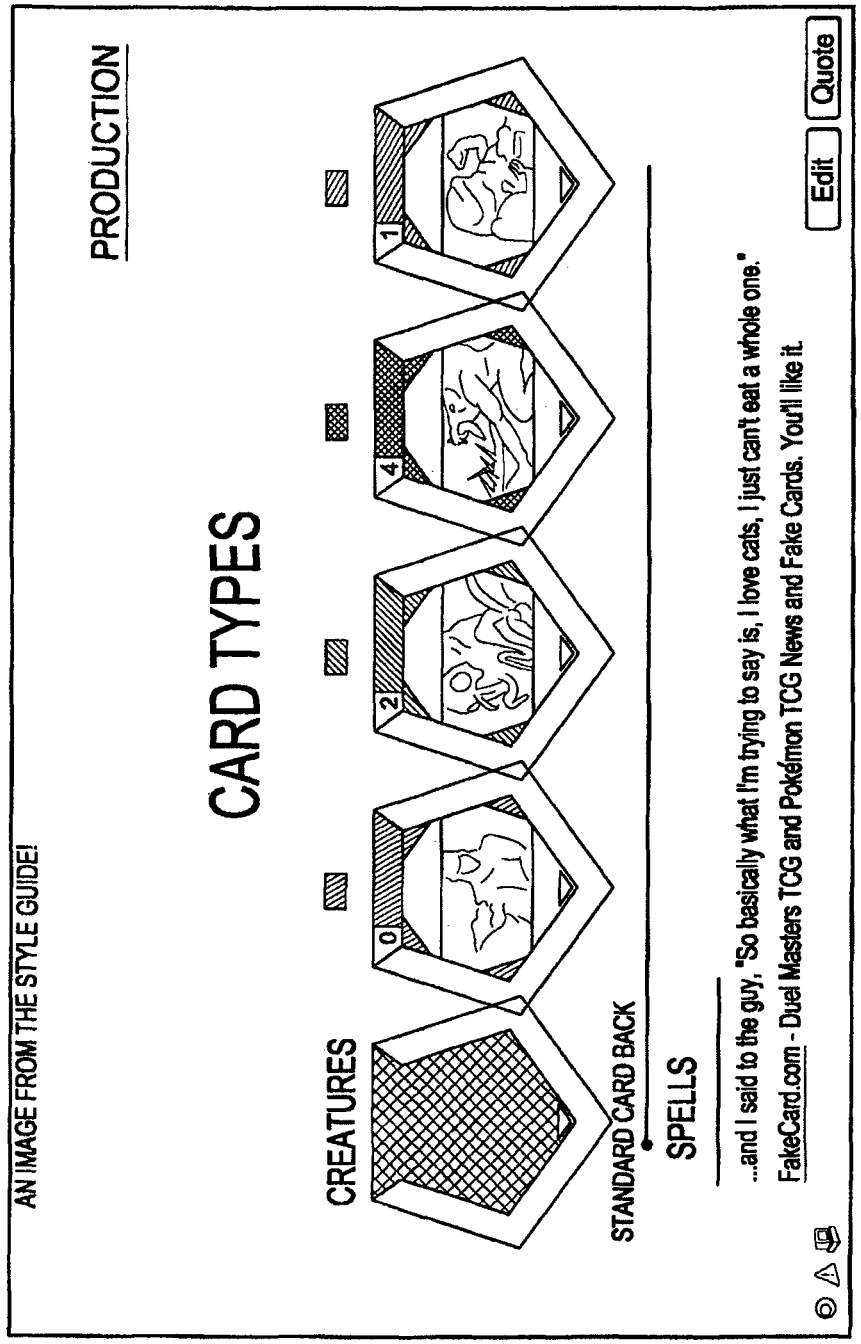
FIG. 7 is a computer display screen illustrating four creature cards in an alternative embodiment to the cards of FIG. 5.

FIG. 7 shows an example of four cards that are similar to the cards of FIG. 5, but which may be employed in an online or electronic version of a card game. Here, various different creature cards are shown, although various other cards may be employed, such as spell cards, or item cards. Each of the cards in the electronic game is an electronic card represented as individual data structures, and which may have unique serial numbers or IDs associated with each of them.

Game play under the example of FIGS. 5 through 7 generally involves combining two or more pentagonal "minion" cards together to make an "abomination" which players use to attack or block one another. The power of an abomination is equal to a sum of powers of the cards, represented by strength or attack values 512. As noted above, each card has two text boxes, one which shows through when combined together (text box 514), and one that does not (text 506). The color coded transparent area 508 when combined with the colored area of an underlying card, determines whether or not abilities described in text 506 apply to a given abomination or not. Cards in the game can break apart abominations, or recombine them into different abominations.

Overall, each player generally begins with a 40-card deck, a supply of counters ("soul counters"), and begins play with five such counters. Each player draws four cards, and the first player draws a single card on the first turn, instead of two cards.

At the start of each turn, players do the following:
1. Draw one soul counter, with the winner being the first to obtain 20 such counters;
2. Draw two cards;
3. Untap any tapped mana cards;
4. Put a soul counter from their pool onto each of their abominations and/or unstacked minions (characters/creatures) that don't have one.

Then, during their turn, players can do the following in any order:
Put a card from their hand into the mana zone, which can only be done once per turn
Put a minion card from their hand into play, as described below
Put an item card from their hand into play,
Play a spell card, or
Attack with one or more abominations, as described below.

Once a player has no more minion, item or spell cards they wish to play, and no more abominations with which they wish to attack, their turn ends.

To play a minion, item or spell card, a player must pay a mana cost 516 associated with that card. To do this, the player must tap mana equal to the mana or casting cost of that card. At least one of the mana tap must match the color of the card being played. Minion cards may be played onto another stacked minion, or onto an existing abomination, or where a player can start a new stack. When played onto another unstacked minion, these minions are now stacked and together form an abomination. When played onto an existing abomination, the minion is now stacked, and becomes the top layer of that abomination. When minion cards are played unstacked, a player takes a soul counter from his or her pool, and places it on that minion. This soul counter still counts towards the player's total.

Only abominations can attack, and abominations cannot attack the turn they are played. Abominations cannot attack the same turn that another layer is added to them, although the abomination can attack first, and then a layer added before the end of the turn. To attack with an abomination, a player removes the soul counter from it and returns it to the player's soul counter pool. Abominations may attack singularly or as a team. If the opponent has an abomination with a soul counter on it, that opponent may choose to block. Blocking does not remove the soul counter from the blocker. If the attacking abomination is blocked, both abominations deal damage to each other equal to their power. Damage is dealt to the top layer down in a stack. If the abomination is not blocked, then that player steals soul counters from the opponent equal to the number of layers of the attacking abomination.

Under another alternative embodiment, a trading card game includes a sticker receiving card that has one portion with some background artwork, and another blank portion. Two or more sets of game mechanic and artwork stickers are provided, which may be applied to the sticker receiving card. The artwork stickers are applied to the background portions, while the game mechanic stickers are applied to the lower portions. In general, only one artwork and one game mechanic sticker are applied to each sticker receiving card. As a result, players can effectively create their own new cards by overlaying stickers on a raw or basic card. The game mechanic or game play stickers affect game play for that game.

Figure 8:
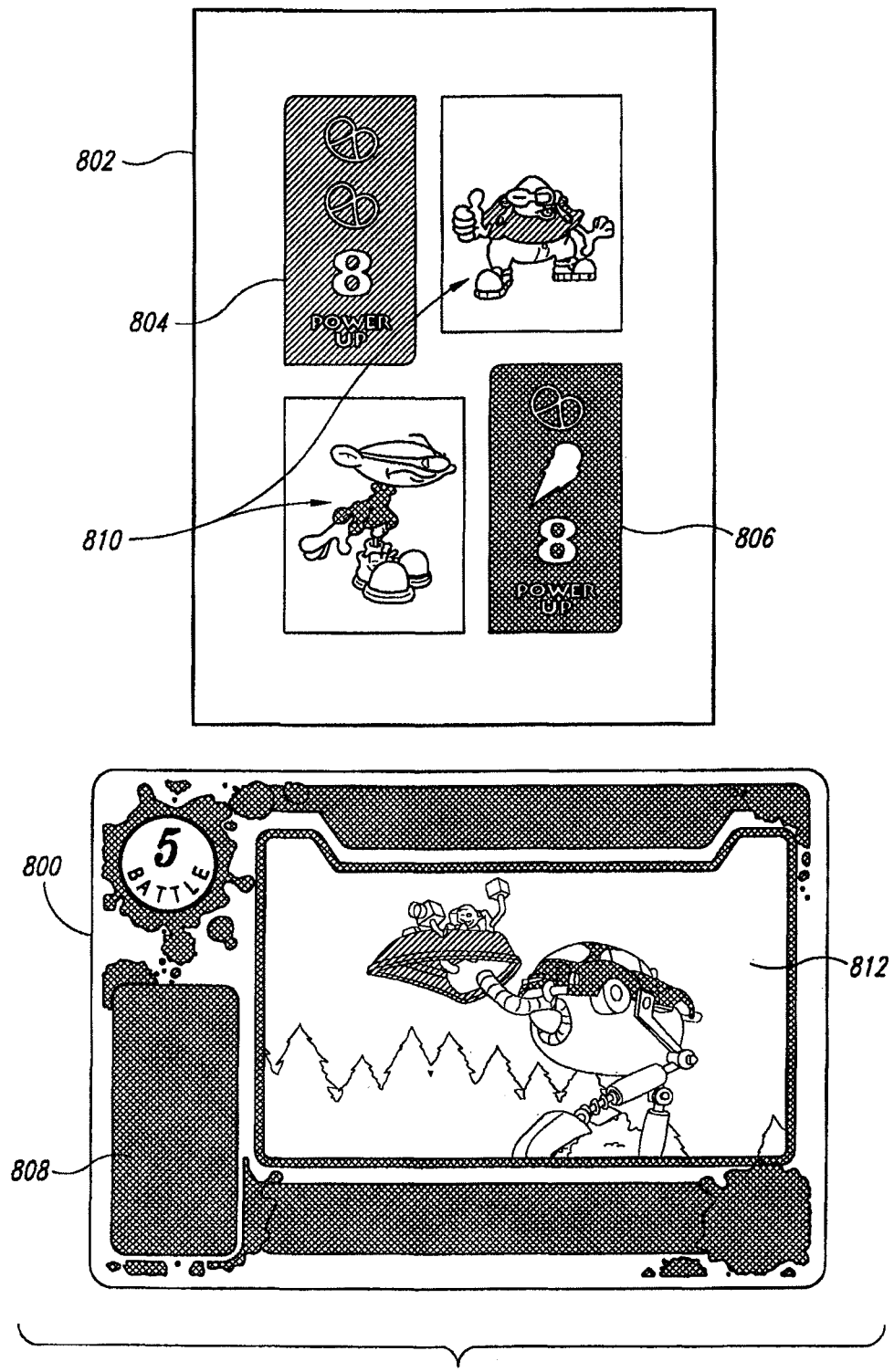
FIG. 8 is a diagram of a sticker card and a sticker receiving card under an alternative embodiment.

FIG. 8 shows an example of this alternative embodiment, with a sticker receiving card 800, and a set of stickers 802 on a card. One of two game play or game mechanic stickers 804 or 806 may be applied to portion 808 of the sticker receiving card 800. One of two artwork stickers 810 may be also placed within a background portion 812.

Under the card game of FIG. 8 (which may be known as The Kids Next Door Card Game), players simultaneously count "one, two, three" and then flip over the top card on their decks. The card with the highest number wins that battle, but if it is a tie, both cards lose. If both cards are of the same color (independent of number), then the first player to slap a "panic button" wins that round. Players can place one or more cards in a reserve. If a card played has an icon that matches an icon in the player's reserve, then the player can add a "power up" value to the point value of his or her card.

Under this game, a subset of the cards are sticker-receiving cards (a game card on which a player places stickers). These cards have all the normal game information, except they have a blank power up box (portion 808). They also have a landscape scene in the art portion 812, with no characters pictured in it. A sheet of stickers (like stickers 802) includes two or more power up stickers (stickers 804, 806), and character art stickers (stickers 810). Before the game starts, players can place one power up sticker and a character art sticker onto the card to customize that card.

Thus, stickers can be used to impact relevant game elements, non-game relevant elements, or both. Under the game, the power up box is the area of the card that tells the player what the card's power up number is, along with a kind of snack (resource) that the player will need to have in the reserve (the "treehouse") to be able to use the displayed power up number rather than a battle number on the card.

Some Alternatives or Additions

Details regarding aspects of the game are found below. For example, when a creature leaves play, the card/object is discarded. In one variant, every card is sleeved when it is played, so that a player has a deck of sleeves in addition to a deck of cards. In another variant, some randomizing event (e.g., a die roll) determines which card receives a sleeve.

With many of the card games noted above, various cards may have different colors or types so that cards of similar color must be played together, or specific combinations of colored cards be played, and so forth. A similar theme may be applied to other games described herein. Of course, while cards are described, various game components may be employed, such as miniature figures, tiles, customizable building models, and so forth. Further details may be found in the assignee's U.S. Pat. No. 7,201,374, entitled, "Method and Article of Manufacture for Collectible Game,". Of course, and as described in more detail below, such cards, figures, tiles, and models may be electronic or virtual game components, or "digital objects." Indeed, these terms are generally used interchangeably herein.

Various other alternatives are possible. For example, cards may have two or more options covered by an opaque, but scratch-off paint. Players can, during the middle of a game, or before the game, scratch off one of the options to provide additional abilities or power to that card. The card then is fixed in its modified form. Alternatively, next time the card is played, another portion may be scratched off to reveal additional underlying text. Alternatively or additionally, each card may be printed with a set of two or more options, and the player simply crosses or scratches out the option which he or she does not wish to apply to that card.

Ink stamps may be employed to stamp abilities onto cards. This is another way to customize a given card, and can also be used to simply add graphics or other ways of customizing a card that do not relate to game play (although alternatively, game play can be affected).

Players can go to a web site to design a given card, sleeve, or other game component and then print that element out for use in subsequent game play. Thus, a player may access a predetermined web site, and using tools at that site, design and print out a card, where that card may be used alone or in conjunction with a sleeve. The player may choose at the web site various elements for the card for a given game (such as by inputting data directly, or by answering a number of related or unrelated questions). The elements that the player chooses may be selected under the web site so that the web site calculates the cost (game play or monetary) of the card and then displays the finished card. The player can then print out the card, cut it from paper, and put it into a normal sleeve for that card to be used in a normal game.

Cards may be perforated in portions. For example, users may tear off a piece of a card for it to be activated. This would allow a card to be played a limited number of times. For example, a dragon card may have a +6 attack at each of its four corners. Each time the dragon attacks during game play, one of four perforated corners is torn off for each attack. As a result, this card gets consumed during game play, and can not be then played again. Alternatively, a player may tear three of four corners off a card to permanently give the card an ability associated with the fourth corner (with the other corners representing other options the user may retain to associate that option with the card).

Cards may have folded portions, such as two oppositely extending wings or panels. A player may then fold one of the two panels over the card to, for example, equip a character on the card with a sword if the left hand panel is folded over, or a shield if the right hand panel is folded over. Thus, cards can be folded in different ways to hide or reveal parts of the card. These can be cards with special flaps that fold either forwards or backwards to reveal or hide certain parts of the card, where these flaps may be folded during game play.

Various game play options are possible. For example, playing a card or game object onto a stack of other cards may provide access to that card's higher-level statistics or abilities. This ability would be specific to that card, and may be modified based on the types or number of cards in the underlying stack. Each card may have two or more "levels" of statistics listed on the card in order. Playing a card on its own gives access only to the lowest level of statistics. Playing a card on top of another card turns the first card face down but gives the player access to the second level of statistics for the new card, and so on.

Cards or objects may have two or more pieces that move relative to each other to provide different statistics for that card (e.g., in a "slide-rule" fashion). For example, a card may be inserted within an outer card, where the outer card has a window that displays different values as the inserted card is moved therethrough. Alternatively, color-based filtering may be employed where one of several abilities is provided and shown depending upon the color of a sleeve into which the card is placed.

Cards or game pieces may be played with miniature figures in an alternative embodiment. For example, cards may be provided that powers up a miniature that is played upon that card. Markers may provide specific features or abilities to a miniature creature upon which they are played. Terrain tiles as cards may be provided and layered on top of each other in a game board to provide for altered terrain during miniature game play.

Physical combinations are possible. For example, standees or stands in which cards are placed may provide additional statistics or powers to the cards placed within them. Sleeves with multiple pockets may be provided to receive two or more cards, such as an L- or T-shaped sleeve to receive two or more cards at right angles. A single sleeve can receive two or more cards.

Modifiable randomizers may be provided, such as dice with removable facets or extra faces, dice made up of six card sleeves, portions of dice, rollers, or other randomizers that clip together, or even magnetic dies or rollers.

Cards may be modified in a variety of ways, such as modifying cards with a grease pencil or other erasable marking before or during game play, where the marks may be wiped off during or after game play. Using "window cling" or electrostatic technology, vinyl or sheet plastic text boxes or shapes may be removably-secured to a plastic card. Clips, such as a paperclip, with text or powers, may be clipped to a card to boost or modify an ability of that card. Further, cards may be made out of metal and modifying statistics provided on magnetic pieces or sheets that would removably-secure to the metal cards. Other methods of modifying game pieces may of course be provided.

A game may employ plastic or virtual pieces that are built up during game play. For example, a goal of the game can be to build a company, where players start off with a small company with only a few employees. Game pieces are then gathered together and played on top of or adjacent to each other to build up the company during game play. Statistics of the other game pieces may change based on the state of the building, and a victory condition under the rules would be to build an object shown in a given card. Alternatively, a victory condition could be for the player to build an object shown on the card, where stats for other cards will change based on the state of the building.

Timers may be employed in any of the games described herein. Such timers can tell a player when that player can use a card's ability again. In a game with real-time elements, associating a timer with a card lets the player use the card's ability. The player can not use the card or the timer again until the timer runs out. Timers can be set for differing amounts of time, and thus such timers can be appropriately marked to distinguish between different time periods.

Tracking Statistics, History, etc. for Cards/Objects

Electronic cards, miniatures, or digital objects with leveling up may be provided under an electronic game system. As one example, miniature figures may include chips within them (e.g., RFID tags in their bases) that when played on a game board, the board or miniatures track interaction of the miniatures with other miniatures or other elements of game play. For example, if a ranger miniature battles a lot of giants, then that ranger would be more effective against giants in future battles. The ability then would flow with that miniature. The game board electronics may track the statistics of that miniature or a smart card chip with tamper-proof memory in the miniature may store such abilities. Alternatively, a central database to which the game board, miniature or a player's computer is connected (e.g., over the Internet) tracks statistics of the miniature to track its increasing experience and associated abilities. Players may be required to take the miniature to a kiosk or other station to register or reregister the miniature to validate that miniature's increased experience.

Thus, each miniature remembers interactions it has had with other miniatures. The miniatures would be used in an electronic miniatures game, where an electronic game board or electronic game controller determines the outcome of battles. The miniatures themselves would use a memory chip that stores information about abilities, statistics and history for that miniature. Thus, a miniature knight would remember that it has, for example, killed five different level 1 monsters, which gives it enough experience to become level 2, which in turn gives it access to some additional abilities (but which may cost more points to put that miniature into an army).

Cards or game objects may be played with miniature figures in an alternative embodiment. For example, cards may be provided that powers up a miniature that is played upon that card. Markers may provide specific features or abilities to a miniature creature upon which they are played. Terrain tiles as cards may be provided and layered on top of each other in a game board to provide for altered terrain during miniature game play.

While described above as carrying a memory chip, the miniature may simply have a unique number or identifier (even a bar code) that uniquely identifies that miniature. A separate database then tracks the history, statistics or other data associated with that miniature, such as its battles, victories, etc. Likewise, cards may each have serial numbers or other unique IDs so that they too may be tracked, as noted herein.

Of course, this game feature is not limited to electronic miniatures, but could extend to other electronic elements, such as electronic game components (e.g., electronic cards or pieces) used in a computer or online game. In one embodiment, electronic cards or game pieces may be set up as digital objects each having a unique identity, with associated tracking data that includes history data and unique customizations, both automatic ones such as visual upgrades from repeated use, and user driven ones, such as attaching a personal custom name to a digital object. Some data relating to the digital object may be stored locally to the player, as well as on one or more remote game servers, which would allow players to play from any machine in the world and have the same play experience. As a result, the game may have the ability to track experience of an electronic card or game piece and change its appearance over time, which may have greater value to players.

In this embodiment, a computer or online game may use a database schema where each digital object or game component has, for example, a 128 bit globally unique identifier (GUID). Thus, with each game component having a GUID, a central database associated with a server computer can track statistical or history data that a given component has. The GUID may relate to a base game component: each unique component in the game is associated with one of a smaller set of particular components that each have effects, abilities, points, etc., but each is also unique based on its GUID. (By analogy, many decks of electronic or virtual playing cards may be created; there are many virtual copies of the ace of spades that have the same effect depending upon a given game, but each ace of spades is unique because of its GUID.) Each digital object includes other information, such as its cost to play, its power in play, its title, etc.

The history data associated with an electronic card may include when it was first created and/or all the games in which it has played and won. This information is stored as a history that is accessible by a player through an appropriate user interface. Other types of tracking data may include: accounting data associated with alliances and guilds within the game and/or annotated notes such as a player's record or blog of his own fiction with respect to a particular game component or its guild. Further, the history data can include data on when the component was first acquired, by whom and where, When/Where/Who opened in pack. Table 1 below shows an example of this tracking data in more detail.

TABLE 1

Tracking Data Examples

| Tracking Data Types | |
|---|---|
| History data | A computer or online game system may track a variety of historical types of data, including:<br>Famous owners of a particular game component<br>List of three most recent players who have owned a particular game component and the dates they owned it<br>Number of battles a game component has participated in<br>Enemies killed<br>Deaths<br>Number of times played<br>Tournament wins/losses |
| Accounting Data | A player may establish guilds and alliances formed between one or more game components. |
| Annotated Notes | Players may add notes to game components in their collection. For example, additional information may be made to an individual game component, or to entire groups of components at once (for example adding a user defined keyword to all the components that fit a certain strategy). |

Players can add notes to digital objects in their collection. They will be able to annotate digital objects they own, to record whatever additional information they choose, where these modifications can be done to an individual objects, or to entire groups of objects at once (for example adding a user defined keyword to all the cards that fit a certain strategy or army type). Players may also be able to search/sort on the basis of these notes.

A variety of functions may be carried out on the tracking data, which includes searching and sorting, customizing, linking, or melding. Table 2 below shows examples of these functions in more detail.

TABLE 2

Example Functions Carried Out On Tracked Data

| Tracking Data Functions | |
|---|---|
| Sorting and Searching | Players may sort and search their collection of game components to find a specific component, a component with particular traits, or one or more components that they have tagged in various ways themselves (e.g., using annotated notes), etc. |
| Customization | A game component, may appear on a computer screen in much the same way it would appear physically (e.g., as an electronic card or game piece). As a game component acquires more experience (e.g., acquires or develops at least one type of history), it may automatically be changed in its appearance, such as by getting a "foil" treatment or be provided other changes to its virtual appearance, which may increase its value to players, increase its effectiveness within a game, or both. For example, when a creature kills 100 others, that game component may be awarded a trophy or a sound effect. |
| Linking | Mutation: Two or more game components may be combined into a unique game component during game play. One game component is a creature and the remaining components are non-creature components. The aggregated game component does not exist externally within a player's collection or deck. For example, a creature (associated with one game component) may be modified or mutated to include a robotic limb (associated with another game component) that provides extra damage to opponents. Nevertheless, the creature and the robotic limb remain two separate game components. Evolution: Two or more game components may be combined into a unique game component during game play. At least two creature type game components create a new aggregated creature object. The aggregated game component does not exist externally within a player's collection. (See "abomination" above.) |

The search capability may include full Boolean searches of data fields, with common conditional evaluations (e.g. "Find all cards with Power>3 AND Cost>10"), substring searches (e.g., "containstext(Destroy Creature)"), or both simultaneously.

To "mutate" or "evolve" a digital object or game component, the player must "pay" or expend a certain number of points/mana as a casting cost (unit costs that players must pay up front to mutate or evolve). Some game components (i.e., a digital object representing a creature) may be more "efficient" at certain mutations/evolutions, and thus cost less. Mutations can also be used to adversely affect an opponent's game components.

The history and other data associated with a game component allows the system to differentiate between "base" tracked data that is inherent to the component with data that a player has appended. During gameplay, two game components may appear the same if they are of the same type, same creature, etc. However, when an individual game component is clicked on, for example, each component's individual history, ranks, notes, look, etc., can be displayed.

Mutation and/or evolution may not be available for trade with respect to game components, but may be available in a chat window, for example, for other players to view. Thus, players may be able to link to mutated/evolved game components to display and show to fellow players in a chat window, blog, etc.

Accordingly, after the tracked data associated with a game component has been modified, the modified components may be bartered or traded, and thus be associated with transactions independent of game play. An e-commerce engine or trading site, for example, may allow players to use PayPal to purchase game components. These game components may also be printed in either two dimensions, or with three dimensional printers, where the printed game component exhibits the newly modified characteristics.

Some Alternatives

Game components may be customized with "visual bling": players may be rewarded superficially (with graphic enhancements, sounds, etc.) for purchasing booster packs (sets of randomly generated digital objects), winning tournaments, and playing the game a certain number of times (e.g., which gives players a sense of identity and personal accomplishment). This type of superficial rewards is a customization, personalization, or enhancement that may be awarded to a player when he has achieved a certain number of points or a level of tracked experience. This experience need not effect gameplay, but just a game component's "look" (e.g. ability to add visual bling) and it can be applied as a player sees fit. In general, the player's points or other type of tracked experience which he uses to attain the reward cannot be taken away by the system. (Of course, the customization may affect game play.)

To earn visual bling, level up, etc., the system may require a time commitment before any rewards are given. Players may be rewarded for purchasing booster packs, winning tournaments, and just playing the game by a number of visual changes that customize their game appearance and their digital object's appearance. This helps make individual objects more unique and gives players more goals to reach, and more identification and sense of accomplishment in owning digital objects. Some upgrades may be visual, such as the winner of a tournament may get colored victory bands added along the side of his or her display. Other upgrades may be audio rewards (e.g., after the $100^{th}$ time a particular digital object plays, it gains a special attack sound effect). Digital objects (or players) could acquire titles (noted below), and/or other graphical additions or effects (color, particle effects, foil, etc.). Titles could be a way to connect such vanity upgrades to appearance with a game metaphor. Object enhancements may also interact with melding and special combination formulas noted herein.

Alternatively or additionally, the game or system may employ an accumulative rating system. Casual games as well as tournament games provide players with points for this rating. Winning a match is worth more than losing and sanctioned matches award more points than casual matches, but any game that takes a sufficient amount of time will earn points (a minimum time may be required to prevent players from repeatedly creating and conceding in casual games to gain points). In other words, a sufficient duration of gameplay may be required to prevent players from gaining points, experience, or levels without providing an adequate or fair investment of time or effort, thus the system may prevent a player from earning a reward by merely entering a tournament and then quickly exiting or terminating that tournament. Under this 'leveling-up' style system, at various totals the system awards a title, such as a medal or other bling to a player of one or more digital objects. Players may gain ranks as they progress with appropriate titles or names.

Alternatively or additionally, the system may employ a "melding machine" that turns multiple less valuable or desirable game components into one or more new game components (randomly generated, or based on a set algorithm). For example, the system may meld two or more common cards to become one uncommon or rare card. Alternatively, two or more game components having a distinctive set of overlapping criteria may be melded into one game component. When melding, they system may employ a formulae that allows players to create particular game components by consuming a specified supply of game components. For example, a certain number of common game components and/or certain type of game components are required for an uncommon one, a certain number of uncommon game components are required for a rare one, etc. Alternatively or additionally, the system may also interact with melding and special combination formulas to provide other combinations.

Under this example, components or digital objects operating at "formulas: can be acquired in sets ("boosters") or as prizes that facilitate special combination operations. Thus, players can acquire such formula digital objects that would permit them to meld or combine a determined number of existing objects that they have into other, likely less common, objects. This formula object may be usable only once, and may also require players to use up points or virtual currency to be part of any combination.

Suitable Computing Environment

Figure 9:
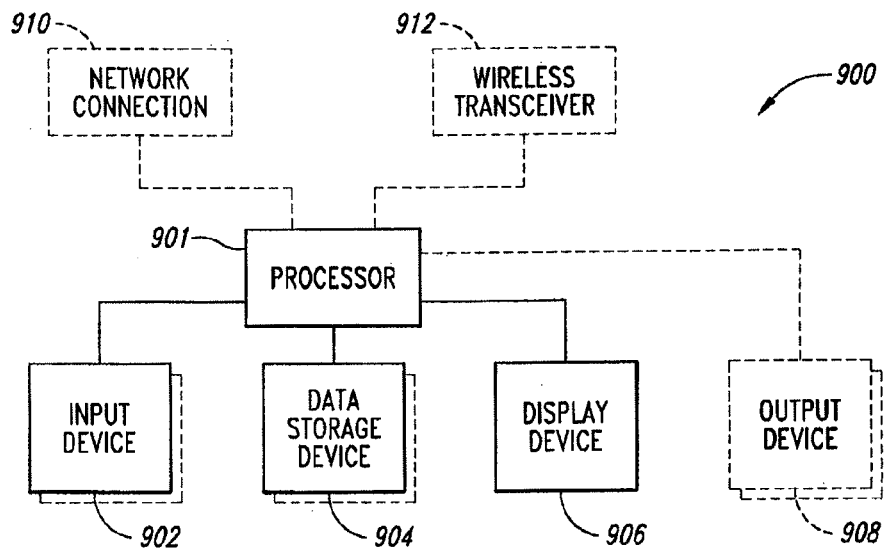
FIG. 9 is block diagram of a basic and suitable computer that may employ aspects of the invention.

FIG. 9 and the following discussion provide a brief, general description of a suitable computing environment in which aspects of the invention can be implemented. Although not required, aspects and embodiments of the invention may be described in the general context of computer-executable instructions, such as routines executed by a general-purpose computer, e.g., a server or personal computer. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured or constructed to perform one or more of the computer-executable instructions explained in detail below. Indeed, the term "computer", as used generally herein, refers to any of the above devices, as well as any data processor.

The invention can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the invention described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to FIG. 9, one embodiment of the invention employs a computer 900, such as a personal computer or workstation, having one or more processors 901 coupled to one or more user input devices 902 and data storage devices 904. The computer is also coupled to at least one output device such as a display device 906 and one or more optional additional output devices 908 (e.g., printer, plotter, speakers, tactile or olfactory output devices, etc.). The computer may be coupled to external computers, such as via an optional network connection 910, a wireless transceiver 912, or both.

The input devices 902 may include a keyboard and/or a pointing device such as a mouse. Other input devices are possible such as a microphone, joystick, pen, game pad, scanner, digital camera, video camera, and the like. The data storage devices 904 may include any type of computer-readable media that can store data accessible by the computer 900, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network such as a local area network (LAN), wide area network (WAN) or the Internet (not shown in FIG. 9).

Figure 10A:
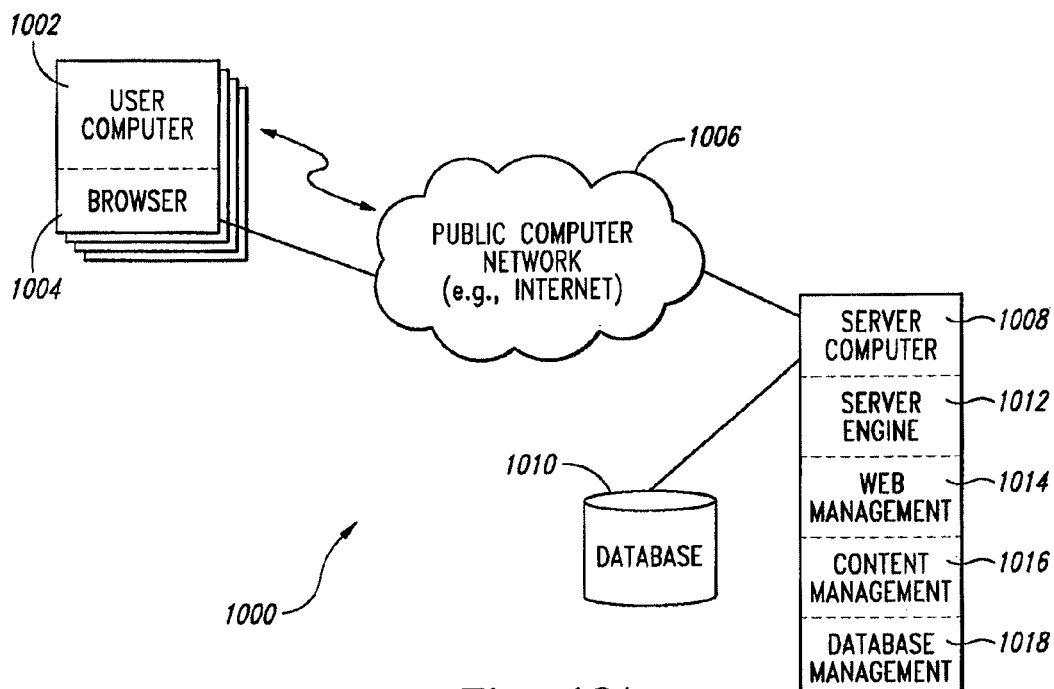
FIG. 10A is a block diagram illustrating a simple, yet suitable system in which aspects of the invention may operate in a networked computer environment.

Aspects of the invention may be practiced in a variety of other computing environments. For example, referring to FIG. 10A, a distributed computing environment with a web interface includes one or more user computers 1002 in a system 1000 are shown, each of which includes a browser program module 1004 that permits the computer to access and exchange data with the Internet 1006, including web sites within the World Wide Web portion of the Internet. The user computers may be substantially similar to the computer described above with respect to FIG. 9. User computers may include other program modules such as an operating system, one or more application programs (e.g., word processing or spread sheet applications), and the like. The computers may be general-purpose devices that can be programmed to run various types of applications, or they may be single-purpose devices optimized or limited to a particular function or class of functions. More importantly, while shown with web browsers, any application program for providing a graphical user interface to users may be employed, as described in detail below; the use of a web browser and web interface are only used as a familiar example here.

At least one server computer 1008, coupled to the Internet or World Wide Web ("Web") 1006, performs much or all of the functions for receiving, routing and storing of electronic messages, such as web pages, audio signals, and electronic images. While the Internet is shown, a private network, such as an intranet may indeed be preferred in some applications. The network may have a client-server architecture, in which a computer is dedicated to serving other client computers, or it may have other architectures such as a peer-to-peer, in which one or more computers serve simultaneously as servers and clients. A database 1010 or databases, coupled to the server computer(s), stores much of the web pages and content exchanged between the user computers, including electronic or virtual game pieces. The server computer(s), including the database(s), may employ security measures to inhibit malicious attacks on the system, and to preserve integrity of the messages and data stored therein (e.g., firewall systems, secure socket layers (SSL), password protection schemes, encryption, and the like).

The server computer 1008 may include a server engine 1012, a web page management component 1014, a content management component 216 and a database management component 1018. The server engine performs basic processing and operating system level tasks. The web page management component handles creation and display or routing of web pages or screens during game play. Users may access the server computer by means of a URL associated therewith. The content management component handles most of the functions in the embodiments described herein. The database management component includes storage and retrieval tasks with respect to the database, queries to the database, and storage of data such as video, graphics and audio signals.

Figure 10B:
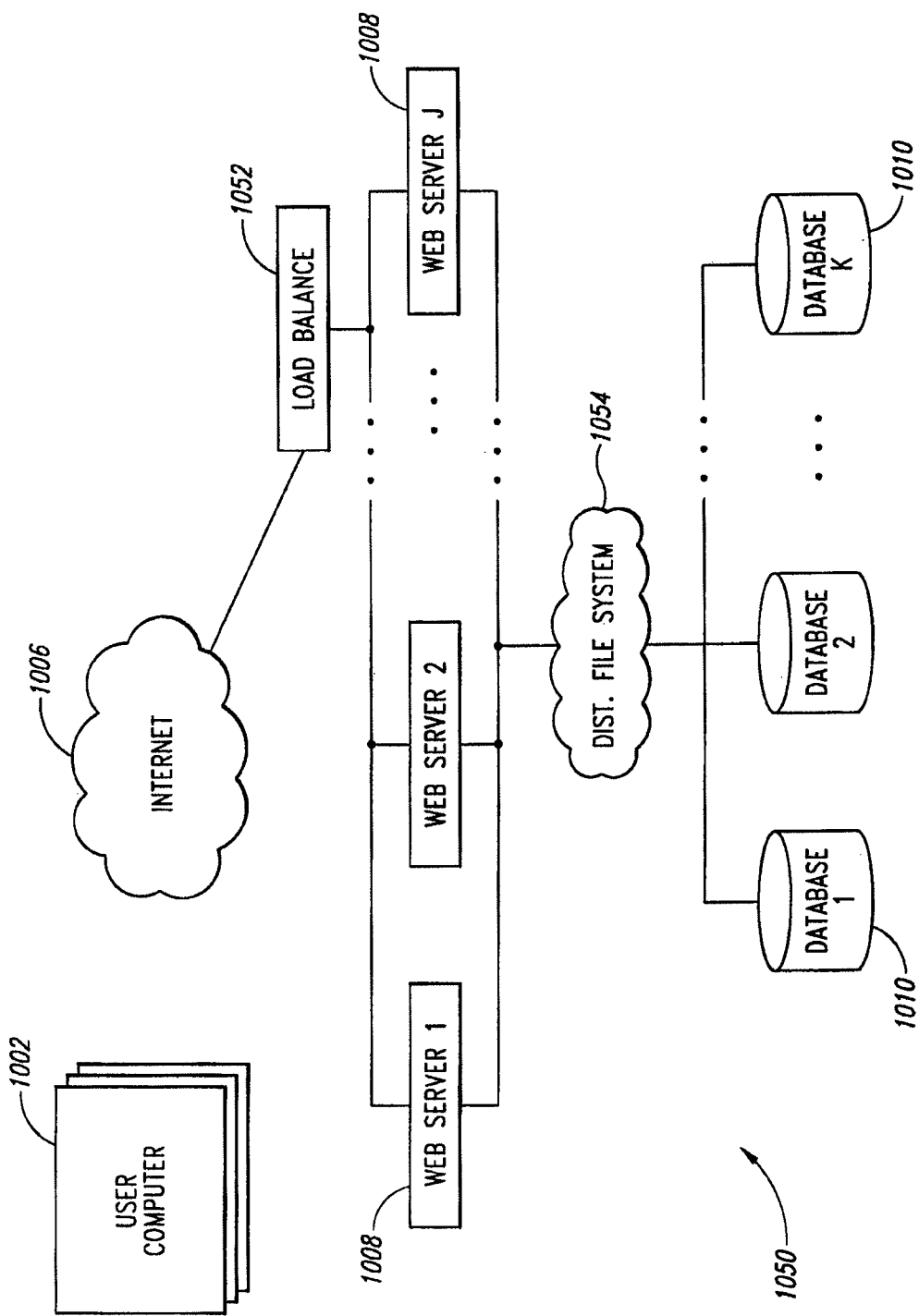
FIG. 10B is a block diagram illustrating an alternative system to that of FIG. 10A.

Referring to FIG. 10B, an alternative embodiment to the system 1000 is shown as a system 1050. The system 1050 is substantially similar to the system 1000, but includes more than one server computer (shown as server computers 1, 2, . . . J). A load balancing system 1052 balances load on the several server computers. Load balancing is a technique well-known in the art for distributing the processing load between two or more computers, to thereby more efficiently process instructions and route data. Such a load balancer can distribute message traffic, particularly during peak traffic times.

A distributed file system 1054 couples the web servers to several databases (shown as databases 1, 2 . . . K). A distributed file system is a type of file system in which the file system itself manages and transparently locates pieces of information (e.g., content pages) from remote files or databases and distributed files across the network, such as a LAN. The distributed file system also manages read and write functions to the databases.

CONCLUSION

In general, the detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

As noted above, certain game components may have differing levels of distribution, from common, to uncommon, to rare. Premium treatments may be applied to certain stickers, cards, sleeves, etc., to enhance collectability, such as foil overlay to provide a shiny appearance to certain stickers or components, holographic printing on pieces, over- or under-printed treatments, transparent or translucent plastics, and textured sheet plastics.

Collation during the manufacturing or electronic generation process determines which stickers, sets of stickers, sleeves, cards, bling, treatments, etc., go in which packs, where a pack would include, for example, two sets of stickers, one or more sleeves, etc. The same sleeve or sticker may be distributed twice, but having a different numeric value. The collation process provides randomness to the distribution of the cards, with some fixed insertions, such as rules. By randomizing certain game components or elements, such as certain rare stickers, as well as stickers having premium treatments, users may be motivated to purchase more packs of the cards in an attempt to obtain such rare components.

Overall, the game creates a repeat purchase incentive by providing random components or pieces. Adding game play under the rules, and strategic construction choices for players, extends the play experience. Many game activities may be provided, such as promotions, organized game play allowing players to play others in a convention, and publications associated with the game.

The game may be augmented with an audio-visual component, such as a videotape or DVD. This audio-visual component may provide instruction or guidance as to how to play the game. Further, such audio-visual component can provide for timing or progress of play. For example, the audio-visual component can provide audio or visual indication as to when players are to begin each round of play.

Unless the context clearly requires otherwise, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, the game mechanic need not be centered on a combat theme. The cards or game elements may employ animals, such as ladybugs or kitty-cats, components being accessories such as purses, jewelry, and so forth. Players may pursue a goal, such as acquiring additional accessories, progressing toward a geographic or spatial destination, etc. Educational, occupational, leisure or other non-combat themes may be employed. Further, while one method of play or set of game rules is described for some embodiments, other game rules may likewise be implemented to provide the player customizability.

Thus, those skilled in the relevant art will readily recognize that the teachings of the invention provided herein may be applied to other game themes or even other games, not necessarily the card games described herein. These and other changes can be made to the invention in light of the detailed description.

All of the above patents and applications and other references, including any that may be listed in accompanying filing papers, are incorporated herein by reference, including U.S. application Ser. No. 10/689,971, entitled METHOD AND ARTICLE OF MANUFACTURE FOR COLLECTIBLE GAME. Aspects of the invention can be modified, if necessary, to employ the systems, functions, and concepts of the various references described above to provide yet further embodiments of the invention.

These and other changes can be made to the invention in light of the Detailed Description. While the above description details certain embodiments of the invention and describes the best mode contemplated, no matter how detailed the above appears in text, the invention can be practiced in many ways. Details of the game may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A game system, comprising:
   first and second decks of cards associated with first and second players, respectively, wherein the first and second decks of cards have been respectively compiled and customized by the first and second players based on a larger set of cards from which the first and second decks were selected,
   wherein each of the first and second decks includes a card customized by the respective first and second players, wherein the customization includes:
      transparent or partially transparent sleeves for receiving cards from the first and second decks, wherein a card to be received within each sleeve includes initial indicia for governing use or play of the card during game play, and wherein each sleeve includes indicia for modifying or superseding the initial indicia for governing use or play of the card; or
      at least first and second transparent or partially transparent cards in each of the first and second decks, wherein the first and second cards each have indicia governing use or play during game play, wherein at least the second card is configured to be played on top of the first card so that the first card's indicia is still displayed through the second card, and wherein the second card's indicia for governing use or play during game play is available for use by a player when the second card is played on top of the first card; or
      at least one player-modified card in each of the first and second decks, wherein the player-modified card includes a card base and at least one of two self-adhesive stickers selected by and applied to the card base to form the player-modified card, wherein each of the two self-adhesive stickers includes indicia governing use or play during game play; and
   wherein each of the first and second decks includes collectable cards having differing levels of rarity with respect to the larger set of cards, including cards that are common and cards that are uncommon.

2. The game system of claim 1 wherein the indicia of the card to be received within the sleeve includes card text representing a power or effect that the card to be received within the sleeve has on game play, and wherein the sleeve is configured to provide modifying or superseding text to cover and replace the card text, and wherein:
   before play of a game,
      the first and second players select a predetermined number of sleeves for use during that game; or
      before play of a game under the game rules, every card in the first or second decks has one of the sleeves; or
      a randomizer determines which cards within the first and second decks receive sleeves.

3. The game system of claim 1 wherein the game is an electronic game, and wherein the first and second decks of cards are first and second decks of electronic cards.

4. A game for play between two or more players, comprising:
   modifiable game piece means, wherein at least some of the game piece means include portions that are transparent, partially transparent or cut to provide voids, and wherein the modifiable game piece means include:
      a bottom game piece that is configured to be played independently by one of the two players without the need for additional game pieces,
      wherein the bottom game piece includes:
         a first portion of text, symbols, or colors that represent a first power or effect that the bottom game piece has with respect to game play, and
         a second portion of text, symbols, or colors that represent a second power or effect that the bottom game piece can have with respect to game play; and
      a top game piece that is configured to be played by one of the two players on top of the bottom game piece so that the first portion of text, symbols, or colors is still displayable through the transparent, partially transparent, or void portions of the top game piece and still have the first power or effect with respect to game play, and wherein the top game piece includes:
         a third portion of text, symbols or colors that represent a third power or effect that the top game piece has with respect to game play, and
         a fourth portion of text, symbols or colors that represent a fourth power or effect that the top game piece has with respect to game play when the top game piece is played on the bottom game piece, but wherein the second power or effect of the bottom game piece is not in effect with respect to game play.

5. The game of claim 4, wherein the top and bottom game pieces are cards and have a square, pentagonal, or hexagonal shape.

6. The game of claim 4 wherein the game is an electronic game and wherein the modifiable game piece means are data structures representing the modifiable game piece means.

7. The game of claim 4 wherein the top and bottom game pieces are formed of a planar, semi-flexible material, and wherein the top and bottom game pieces are configured so that when the top game piece is played on the bottom game piece, the second portion of text, symbols, or colors are obscured by the top game piece.

8. The game of claim 4, wherein the modifiable game piece means are packaged for distribution so as to obscure at least one of the modifiable game piece means, and wherein each of the modifiable game piece means has one of at least three distribution categories, wherein the three distribution categories are common, uncommon and rare, which correspond respectively to three levels of distribution rarity.

9. A method comprising:
obtaining a set of cards, wherein the set of cards comprises:
at least one card base that is configured to be played in a modified or unmodified form; and
at least first and second indicia carriers configured to be applied to the card base by a player to form a player-modified card,
wherein each of the first and second indicia carriers includes indicia governing power or effect of the player-modified card during game play; and,
wherein the set of cards includes cards that are common, uncommon and rare with respect to distribution of the cards;
physically modifying the card base by way of one of the first and second indicia carriers to produce the player-modified card;
constructing a deck of cards from a subset of the set of cards, wherein the deck of cards includes the player-modified card;
shuffling the deck of cards; and
playing a round of the game.

10. The method of claim 9 wherein the first and second indicia carriers are first and second self-adhesive stickers, and wherein the modifying includes applying the first sticker to the card base, and applying at least one art work sticker to the card base.

11. The method of claim 9 wherein the modifying includes scratching off opaque paint, or crossing out with a writing implement one of two indicia on the card base.

12. The method of claim 9 wherein the first and second indicia carriers are first and second ink stamps, erasable marks, clips having indicia, planar magnets or electrostatic cling plastic sheets.

13. The method of claim 9 wherein the modifying includes tearing off from the card base one of the first and second indicia carriers.

14. The method of claim 9 wherein the modifying includes folding one of the first and second indicia carriers with respect to the card base.

15. The method of claim 9, further comprising playing a prerecorded audio-visual aid distributed with the game to learn how to play the game.

16. The method of claim 9, further comprising:
tracking experience of at least one electronic card of the obtained set of cards; and
changing the appearance of the at least one electronic card of the obtained set of cards based at least in part on the tracked experience of the at least one electronic card of the obtained set of cards.

17. An article of manufacture, comprising:
rule means for defining a goal and a series of actions of play for achieving the goal between two or more players; and
modifiable physical game piece means, wherein at least some of the modifiable game piece means include:
multiple physical standard game piece means, wherein each standard game piece means includes text, symbols or colors that represent a standard power or effect that the standard game piece means has with respect to game play; and,
at least one physical indicia altering means for player-selected modification of at least one of the multiple standard game piece means,
wherein the indicia altering means is configured to alter the text, symbols or colors of the at least one standard game piece means to thereby alter the standard power or effect to provide an altered power or effect that the at least one standard game piece means now has with respect to game play.

18. The article of manufacture of claim 17, further comprising a timer for providing a duration for the standard or altered power or effect.

19. The article of manufacture of claim 17 wherein the indicia altering means includes a colored, transparent window to selectively display the text, symbols or colors.

20. The article of manufacture of claim 17 wherein the indicia altering means includes a window formed in an outer sleeve into which the at least one of the multiple standard game piece means is inserted to selectively display some of the text, symbols or colors.

21. The article of manufacture of claim 17 wherein the indicia altering means includes a standee or sleeve with at least one pocket to receive at least one of the multiple standard game piece means.

22. The article of manufacture of claim 17 wherein the article of manufacture is a computer-readable medium.

* * * * *